US011553049B2

(12) United States Patent
Tsuji

(10) Patent No.: US 11,553,049 B2
(45) Date of Patent: Jan. 10, 2023

(54) NON-TRANSITORY COMPUTER-READABLE RECORDING MEDIUM STORING COMPUTER READABLE INSTRUCTIONS FOR TERMINAL DEVICE, TERMINAL DEVICE AND COMMUNICATION DEVICE

(71) Applicant: BROTHER KOGYO KABUSHIKI KAISHA, Nagoya (JP)

(72) Inventor: Ryoya Tsuji, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/218,482

(22) Filed: Mar. 31, 2021

(65) Prior Publication Data

US 2021/0306430 A1 Sep. 30, 2021

(30) Foreign Application Priority Data

Mar. 31, 2020 (JP) .............................. JP2020-063609

(51) Int. Cl.
*H04L 67/51* (2022.01)
*H04L 67/02* (2022.01)
*H04L 51/48* (2022.01)
*H04W 76/10* (2018.01)
*G06F 3/12* (2006.01)

(52) U.S. Cl.
CPC .............. *H04L 67/51* (2022.05); *H04L 51/48* (2022.05); *H04L 67/02* (2013.01); *G06F 3/1293* (2013.01); *H04W 76/10* (2018.02)

(58) Field of Classification Search
CPC ......... H04L 67/02; H04L 67/51; H04L 51/48; H04W 76/10; G06F 3/1293

USPC ......................................... 709/206
See application file for complete search history.

(56) References Cited

U.S. PATENT DOCUMENTS

| 2012/0069386 | A1* | 3/2012 | St. Laurent | ........... G06F 3/1292 |
| | | | | 358/1.15 |
| 2016/0070511 | A1* | 3/2016 | Nishida | ................. G06F 3/1204 |
| | | | | 358/1.14 |
| 2017/0005876 | A1 | 1/2017 | Shibata | |

(Continued)

FOREIGN PATENT DOCUMENTS

JP 2017-017601 A 1/2017

OTHER PUBLICATIONS

WiFi Alliance, "Device Provisioning Protocol Specification," Jun. 17, 2019. Version 1.1.13. 146 pages.

*Primary Examiner* — Wing F Chan
*Assistant Examiner* — Leon Y Tseng
(74) *Attorney, Agent, or Firm* — Scully Scott Murphy and Presser

(57) ABSTRACT

A first terminal device may obtain address information by using a communication device different from the first terminal device, the address information being for sending information to a second terminal device different from both the first terminal device and the communication device; send connection information to the communication device, the connection information being for the communication device to connect to a network; and after the connection information has been sent to the communication device, send notification information with the obtained address information as a destination, the notification information indicating that the connection information has been sent to the communication device.

20 Claims, 7 Drawing Sheets

(56) References Cited

U.S. PATENT DOCUMENTS

| | | |
|---|---|---|
| 2018/0069718 A1* | 3/2018 | Terao .................. H04L 12/28 |
| 2018/0077255 A1* | 3/2018 | Goto .................. H04W 4/50 |
| 2018/0019229 A1 | 7/2018 | Shibata |
| 2018/0192291 A1 | 7/2018 | Shibata |
| 2019/0196761 A1* | 6/2019 | Minakawa ........... H04W 12/50 |
| 2019/0303048 A1* | 10/2019 | Suzuki ................ G06F 3/1292 |
| 2020/0004469 A1* | 1/2020 | Tomida ............... G06F 3/1287 |
| 2021/0049576 A1* | 2/2021 | Anson ................. G06Q 40/12 |
| 2021/0096798 A1* | 4/2021 | Nakamura ........... G06F 3/1292 |
| 2021/0099950 A1* | 4/2021 | Shibata ............... H04W 76/10 |

* cited by examiner (Comparative Example)

NON-TRANSITORY COMPUTER-READABLE RECORDING MEDIUM STORING COMPUTER READABLE INSTRUCTIONS FOR TERMINAL DEVICE, TERMINAL DEVICE AND COMMUNICATION DEVICE

CROSS-REFERENCE TO RELATED APPLICATION

This application claims priority to Japanese Patent Application No. 2020-063609, filed on Mar. 31, 2020, the entire contents of which are incorporated herein by reference.

TECHNICAL FIELD

The disclosure herein relates to art in which connection information for connecting a communication device to a network is communicated between a terminal device and the communication device.

BACKGROUND

Device Provisioning Protocol (DPP) scheme, which is a scheme for establishing a wireless connection between a pair of devices, is known.

SUMMARY

For example, it is assumed that after a worker has connected a communication device to a network by using a terminal device, information related to this connection should be notified to another worker. In such a situation, the worker may call the other worker to notify the information, for example. Alternatively, the worker may activate a mailer in the terminal device and manually input an e-mail address of the other worker to notify the information. It is desirable to reduce such workload.

The disclosure herein provides art that enables a reduction in workload on a user of a terminal device in a situation where connection information for connecting a communication device to a network is sent from the terminal device to the communication device and this sending of the connection information is to be notified by the user of the terminal device to another user.

A non-transitory computer-readable recording medium storing computer readable instructions for a first terminal device is disclosed herein. The computer readable instructions, when executed by a processor of the first terminal device, may cause the first terminal device to: obtain address information by using a communication device different from the first terminal device, the address information being for sending information to a second terminal device different from both the first terminal device and the communication device; send connection information to the communication device, the connection information being for the communication device to connect to a network; and after the connection information has been sent to the communication device, send notification information with the obtained address information as a destination, the notification information indicating that the connection information has been sent to the communication device.

Also, a communication device is disclosed herein. The communication device may include: an output unit; a memory storing address information for sending information to a second terminal device different from the communication device; and a controller. The controller may be configured to: cause the output unit to output the address information in the memory, wherein the address information is obtained by a first terminal device different from both the communication device and the second terminal device; receive connection information from the first terminal device, the connection information being for the communication device to connect to a network, wherein in a case where the connection information is sent to the communication device, the first terminal device sends notification information by using the address information as a destination, the notification information indicating that the connection information has been sent to the communication device; in a case where the connection information is received from the first terminal device, connect the communication device to the network by using the connection information; and after the communication device has been connected to the network, execute predetermined communication via Internet by using the network with the second terminal device which has received the notification information.

A computer-readable recording medium storing the aforementioned computer program for the first terminal device, the first terminal device itself, and a method executed by the first terminal device are also novel and useful. A computer program for the aforementioned communication device, a computer-readable recording medium storing the computer program, and a method executed by the communication device are also novel and useful. Further, a communication system that comprises the first terminal device and the communication device is also novel and useful.

DETAILED DESCRIPTION

Figure 1:
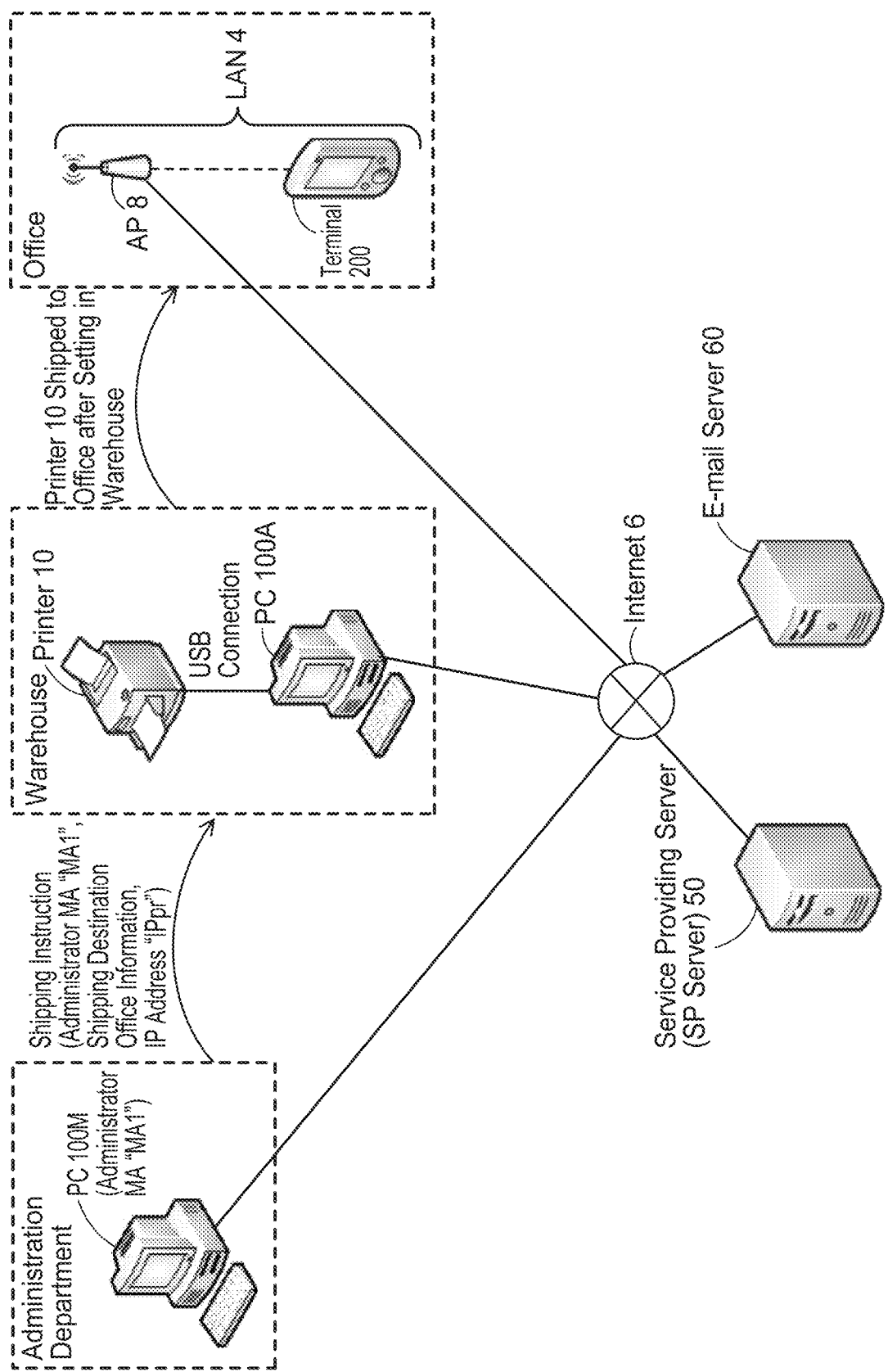
FIG. 1 shows an overview of an embodiment.

Overview of Embodiment; FIG. 1

An overview of an embodiment will be described with reference to FIG. 1. In the present embodiment, a purchased printer 10 stored in a warehouse of a business entity is shipped to a certain office of this business entity according to an instruction from an administrator who belongs to a network administration department of the business entity. The administration department, the warehouse, and the office are respectively situated at different locations.

A PC 100M used by the administrator is installed in the administration department. The PC 100M is connected to the Internet 6. An administrator e-mail address "MA1", which is an e-mail address of the administrator, is set in the PC 100M. Hereinbelow, an e-mail address will be denoted simply as "MA". The administrator gives a shipping instruction to a worker in the warehouse (hereinbelow, termed "warehouse worker") by using a contact measure such as telephone, e-mail, or the like. Specifically, the administrator informs the warehouse worker of the administrator MA "MA1", shipping destination office information (such as the address of the office), and an IP address "IPpr" to be set in the printer 10.

A PC 100A used by the warehouse worker is installed in the warehouse. The PC 100A is connected to the Internet 6. The warehouse stores a plurality of purchased printers including the printer 10. The warehouse worker performs a setting process on the printer 10 according to the shipping instruction from the administrator. Specifically, the warehouse worker connects the PC 100A to the printer 10 via a Universal Serial Bus (USB) cable and sets the administrator MA "MA1" and the IP address "IPpr" in the printer 10 by using the PC 100A. When completing the setting process on the printer 10, the warehouse worker ships the printer 10 to the office identified by the shipping destination office information.

An access point 8 (hereinbelow, an access point will be denoted simply as "AP") and a terminal 200 used by a worker in the office (hereinbelow, termed "office worker") are installed in the office. The AP 8 forms a wireless Local Area Network (LAN) 4 and is connected to the Internet 6. The terminal 200 is connected to the wireless LAN 4. The office worker uses the terminal 200 to cause the terminal 200 to obtain the administrator MA "MA1" and the IP address "IPpr" set in the printer 10. The terminal 200 further sends to the printer 10 information for establishing a Wi-Fi connection between the printer 10 and the AP 8. As a result, a Wi-Fi connection is established between the printer 10 and the AP 8. Then, the terminal 200 sends a notification e-mail with the obtained administrator MA "MA1" as the destination. The notification e-mail indicates that the aforementioned information has been sent to the printer 10, that is, that the printer 10 has been connected to the wireless LAN 4 formed by the AP 8.

The above notification e-mail is received by the PC 100M of the administrator via an e-mail server 60. The e-mail server 60 serves as both a Post Office Protocol (POP) server, which is an e-mail receiving server, and a Simple Mail Transfer Protocol (SMTP) server, which is an e-mail sending server. The administrator can acknowledge that the printer 10 has been connected to the wireless LAN 4 by reading the notification e-mail. In this case, the administrator registers information related to the printer 10 to a service provision server (hereinbelow denoted simply as "SP server") 50 on the Internet 6 by using the PC 100M. The SP server 50 is installed on the Internet 6 by a vendor of the printer 10. In a variant, the SP server 50 may be installed on the Internet 6 by an entity different from the vendor.

Figure 2:
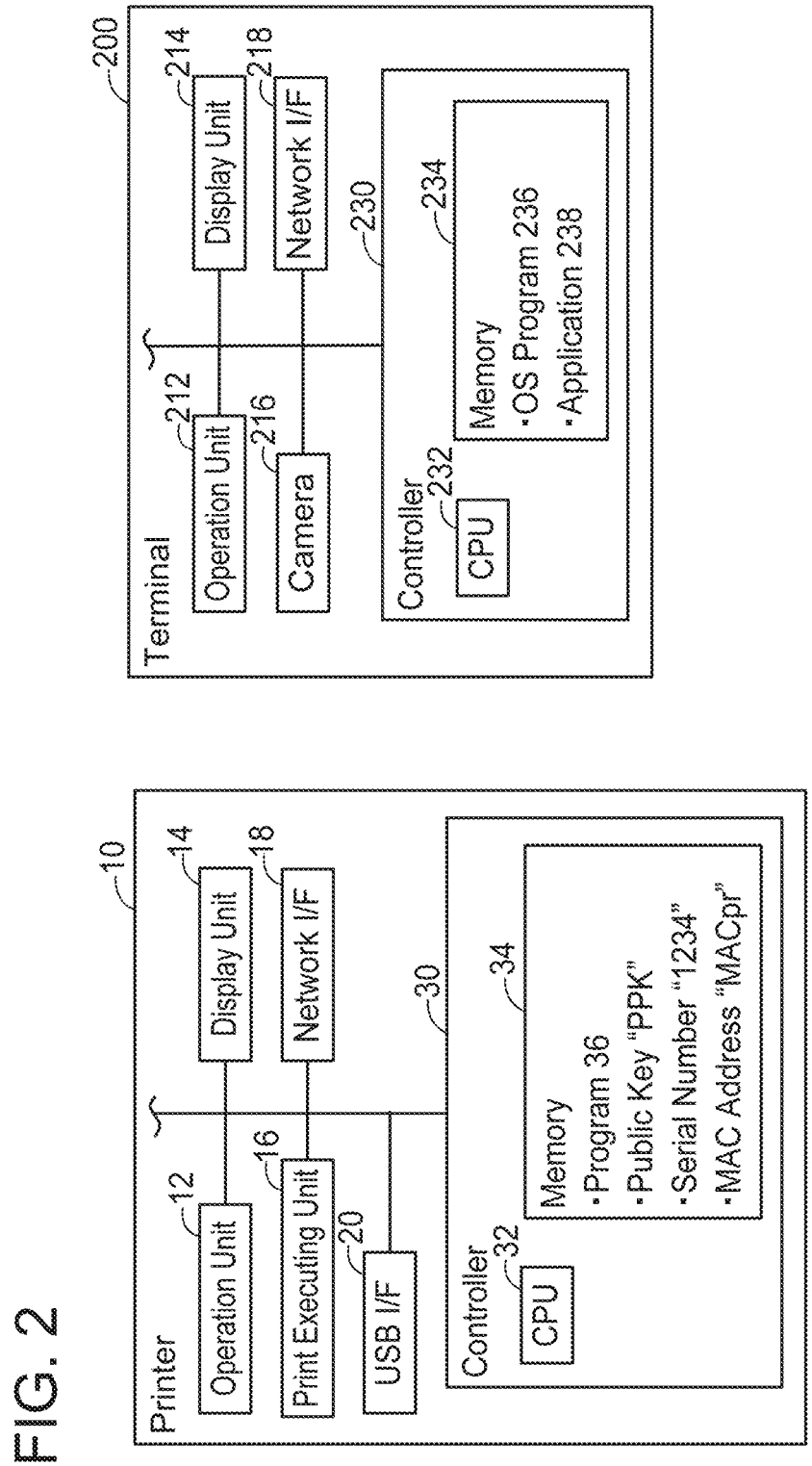
FIG. 2 shows hardware configurations of a printer and a terminal.

(Hardware Configurations of Printer 10 and Terminal 200; FIG. 2)

Next, hardware configurations of the printer 10 and the terminal 200 will be described with reference to FIG. 2.

(Configuration of Printer 10)

The printer 10 is a peripheral device (e.g., a peripheral device of a PC) configured to execute a print function. In a variant, the printer 10 may be a multi-function device configured to execute a scan function, a FAX function, and the like in addition to the print function. The printer 10 is further includes a web server function. The printer 10 includes an operation unit 12, a display unit 14, a print executing unit 16, a network interface 18 (hereinbelow, an interface will be denoted simply as "I/F"), a USB I/F 20, and a controller 30. The units 12 to 30 are connected to a bus line (reference sign omitted).

The operation unit 12 is provided with a plurality of keys. A user can input various instructions to the printer 10 by operating the operation unit 12. The display unit 14 is a display configured to display various types of information. The print executing unit 16 is provided with a print mechanism of an inkjet scheme, a laser scheme, or the like. The USB I/F 20 is an I/F to which a USB cable can be connected.

The network I/F 18 is a wireless interface configured to execute Wi-Fi communication according to Wi-Fi standard. The Wi-Fi standard is, for example, a standard for executing wireless communication according to the 802.11 standard of the Institute of Electrical and Electronics Engineers, Inc. (IEEE) or standards complying therewith (such as 802.11a, 11b, 11g, 11n). The network I/F 18 supports Device Provisioning Protocol (DPP) scheme established by the Wi-Fi Alliance. The DPP scheme is described in the Standard "Device Provisioning Protocol Specification Version 1.1.13" created by the Wi-Fi Alliance.

The controller 30 is provided with a CPU 32 and a memory 34. The CPU 32 is configured to execute various processes according to a program 36 stored in the memory 34. The memory 34 is configured of a volatile memory, a nonvolatile memory, and the like. The memory 34 has been storing a public key "PPK" of the printer 10, a serial number "1234" of the printer 10, and a MAC address "MACpr" of the network I/F 18 since a shipping stage of the printer 10 (i.e., before the printer 10 was stored in the warehouse).

(Configuration of Terminal 200)

The terminal 200 is a portable terminal device such as a cellphone (e.g., a smartphone), a PDA, or a tablet PC. In a variant, it may be a stationary terminal device. The terminal 200 includes an operation unit 212, a display unit 214, a camera 216, a network I/F 218, and a controller 230. The units 212 to 230 are connected to a bus line (reference sign omitted).

The operation unit 212 is provided with a plurality of keys. A user can input various instructions to the terminal 200 by operating the operation unit 212. The display unit 214 is a display configured to display various types of information. The camera 216 is a device configured to capture images of objects. In the present embodiment, the camera 216 is used to capture a QR Code (registered trademark) displayed by the printer 10. The network I/F 218 is a wireless I/F configured to execute Wi-Fi communication according to the Wi-Fi standard. The network I/F 218 supports the DPP scheme.

The controller 230 is provided with a CPU 232 and a memory 234. The CPU 232 is configured to execute various processes according to an OS program 236 and an application 238 stored in the memory 234. The memory 234 is configured of a volatile memory, a nonvolatile memory, and the like. The OS program 236 is a program for executing basic processes. The application 238 is a program for executing processes according to the DPP scheme and sending a notification e-mail to an MA obtained through the processes. The application 238 is installed in the terminal 200 from a server provided by the vendor of the printer 10 or a storage medium.

Figure 3:
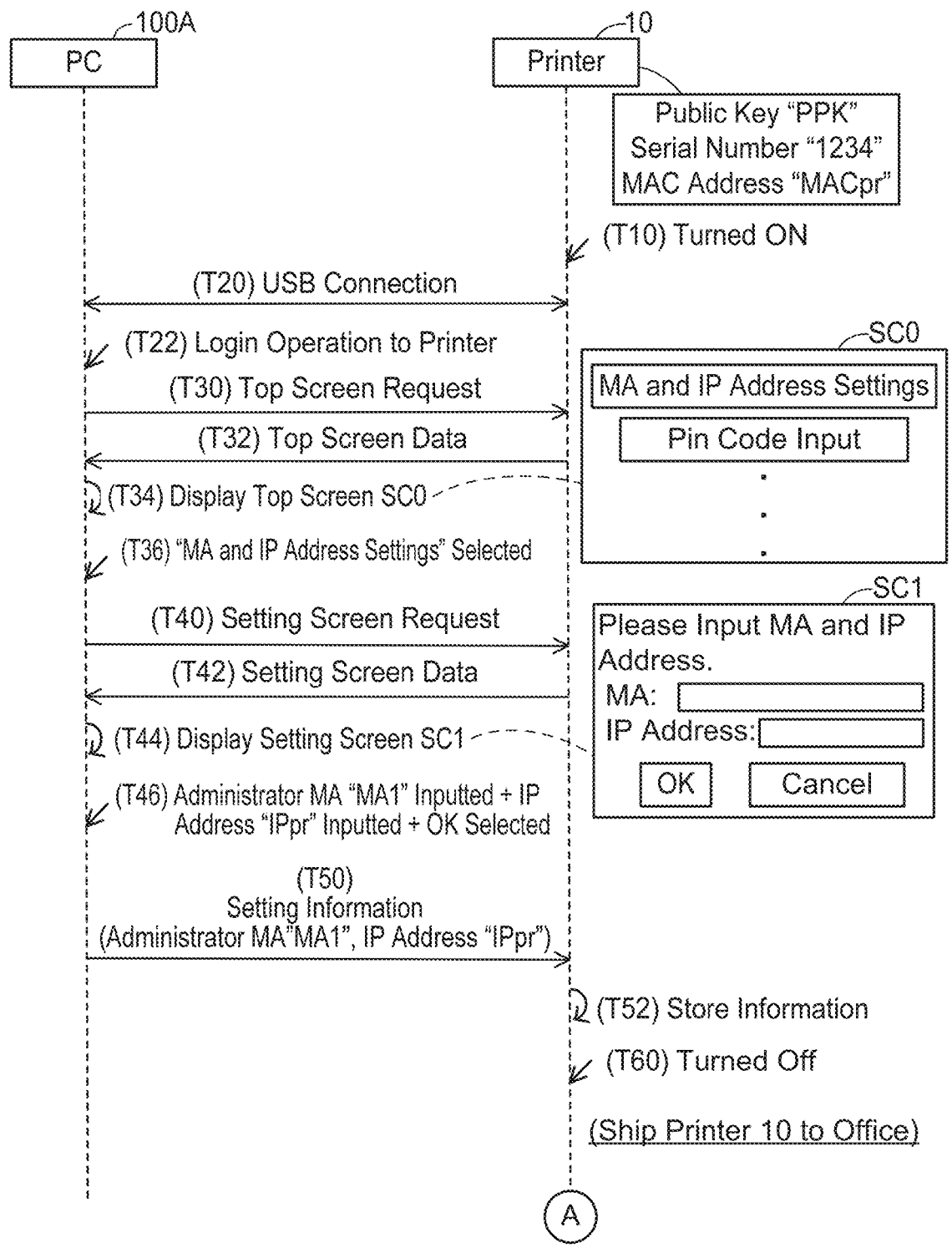
FIG. 3 is a sequence diagram showing a process executed in a warehouse.

(Process in Warehouse; FIG. 3)

Next, a process executed in the warehouse will be described with reference to FIG. 3. As described, the printer 10 stores in advance the public key "PPK", the serial number "1234", and the MAC address "MACpr". Hereinbelow, to facilitate understanding, processes executed by a CPU (such as the CPU 32) of each device (such as the printer 10) will be described with the device (such as the printer 10) as the subject of action, instead of describing the CPU as the subject of action.

When receiving the shipping instruction from the administrator, the warehouse worker turns on the printer 10 in T10 and connects the PC 100A to the printer 10 via a USB cable in T20. In the following processes of FIG. 3, every communication between the PC 100A and the printer 10 is executed via the USB cable. As such, in the following description, a phrase "via the USB cable" will be omitted in explaining processes related to the communication.

In T22, the PC 100A accepts an operation for logging into the web server of the printer 10 from the warehouse worker. When accepting the login operation, the PC 100A sends a top screen request to the printer 10 in T30.

When receiving the top screen request from the PC 100A in T30, the printer 10 sends top screen data to the PC 100A in T32.

When receiving the top screen data from the printer 10 in T32, the PC 100A displays a top screen SC0 represented by the top screen data in T34. The top screen SC0 includes a plurality of buttons including a setting button for setting an MA and an IP address in the printer 10 (i.e., a letter string "MA and IP Address Settings") and an input button for inputting a PIN code (i.e., a letter string "PIN Code Input").

When accepting selection of the setting button in the top screen SC0 from the warehouse worker in T36, the PC 100A sends a setting screen request to the printer 10 in T40.

When receiving the setting screen request from the PC 100A in T40, the printer 10 sends setting screen data to the PC 100A in T42.

When receiving the setting screen data from the printer 10 in T42, the PC 100A displays a setting screen SC1 represented by the setting screen data in T44. The setting screen SC1 includes a message that prompts the user of the PC 100A (i.e., the warehouse worker) to input an MA and an IP address, an MA input box, an IP address input box, an OK button, and a cancel button.

As described, the warehouse worker has already obtained the administrator MA "MA1" and the IP address "IPpr" from the administrator. In T46, the PC 100A accepts, from the warehouse worker, input of the administrator MA "MA1" to the MA input box, input of the IP address "IPpr" to the IP address input box, and selection of the OK button in the setting screen SC1. In response to this, the PC 100A sends setting information including the MA "MA1" and the IP address "IPpr" inputted in T46 to the printer 10 in T50.

When receiving the setting information from the PC 100A in T50, the printer 10 stores the MA "MA1" and the IP address "IPpr" included in the setting information in the memory 34 in T52. As above, in response to receiving the MA "MA1" and the IP address "IPpr" from the PC 100A, the printer 10 can suitably store these pieces of information. After this, the printer 10 accepts a turn-off operation in T60. As a result, the printer 10 is turned off. As described, the warehouse worker has already obtained the shipping destination office information from the administrator. Thus, the warehouse worker can ship the printer 10 to the office identified by the obtained shipping destination office information.

Figure 4:
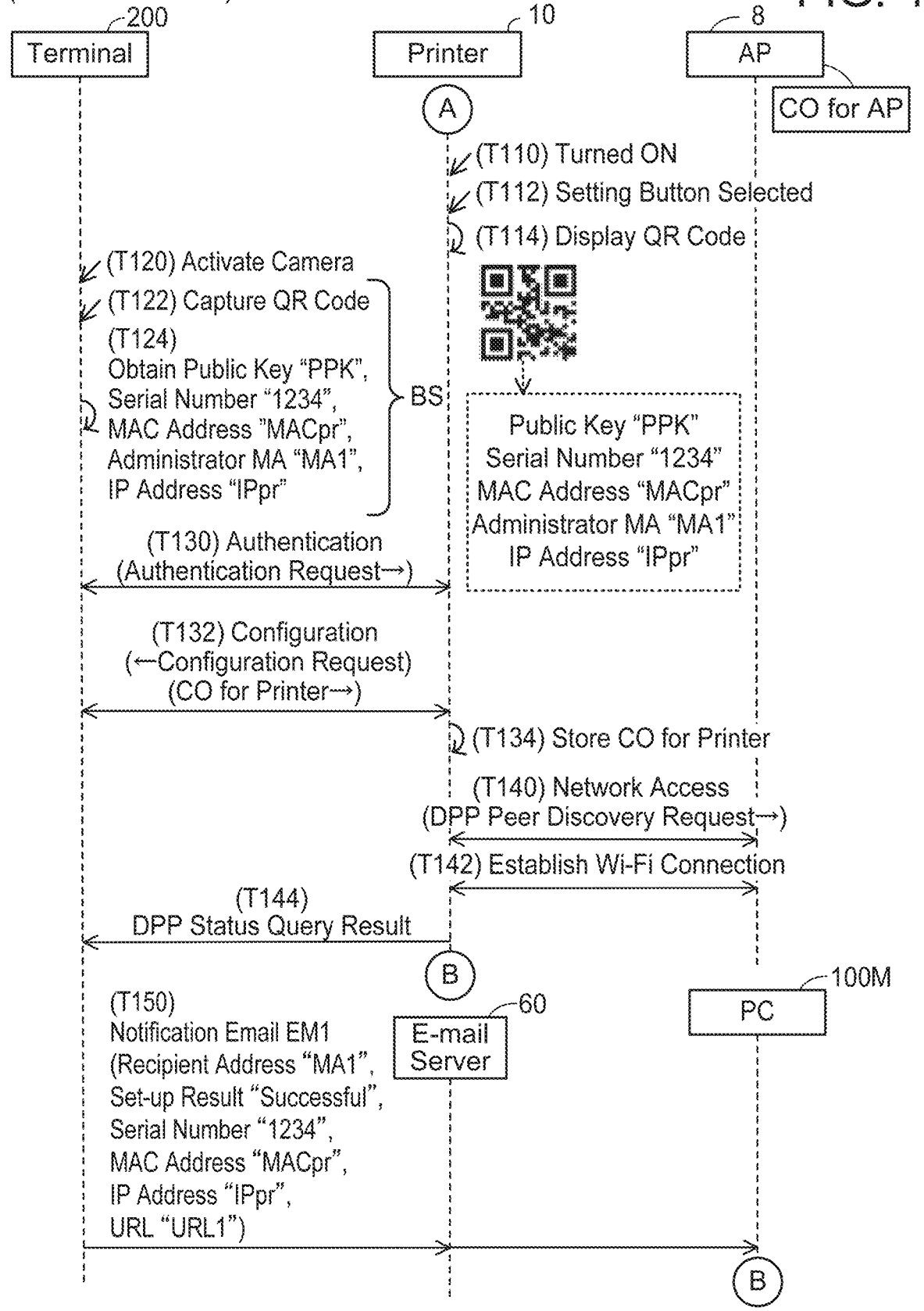
FIG. 4 is a sequence diagram showing a process executed in an office.

(Process in Office; FIG. 4)

Next, a process executed in the office will be described with reference to FIG. 4. In an initial state of FIG. 4, communication according to the DPP scheme has already been executed between the terminal 200 and the AP 8. In this situation, the terminal 200 operates as a Configurator of the DPP scheme and the AP 8 operates as an Enrollee of the DPP scheme. The Configurator refers to a device that sends a Configuration Object to the Enrollee in Configuration of the DPP scheme. Hereinbelow, the Configuration and the Configuration Object will respectively be denoted simply as "Config" and "CO". The Enrollee refers to a device that receives the CO from the Configurator in the Config. As such, a CO for AP is sent from the terminal 200 being the Configurator to the AP 8 being the Enrollee, and the CO for AP is stored in the AP 8. The CO for AP is information to be used by the AP 8 to establish a Wi-Fi connection between the AP 8 and the printer 10. Every communication executed by the printer 10 and the terminal 200 is executed via the network I/Fs 18, 218. As such, in the following description, a phrase "via the network I/F 18 (or 218)" will be omitted in explaining processes related to the communication.

The printer 10 accepts a turn-on operation from the office worker in T110 and accepts a setting button operation for establishing a Wi-Fi connection between the printer 10 and the AP 8 in T112. In this case, in T114, the printer 10 causes the display unit 14 to display a QR Code. This QR Code is a code image obtained by coding information including the public key "PPK", the serial number "1234", the MAC address "MACpr", the administrator MA "MA1" (see T52 of FIG. 3), and the IP address "IPpr" (see T52) which have been already stored in the printer 10.

When accepting a camera activation operation from the office worker in T120, the terminal 200 activates the camera 216 and captures the QR Code displayed on the printer 10 (see T114) in T122. Then, in T124, the terminal 200 decodes the captured QR Code by using the application 238 to obtain the public key "PPK", the serial number "1234", the MAC address "MACpr", the administrator MA "MA1", and the IP address "IPpr". In other words, the processes of T122 and T124 are Bootstrapping (hereinbelow denoted as "BS") of the DPP scheme executed between the terminal 200 and the printer 10. All the following processes executed by the terminal 200 are executed by the application 238.

As above, the office worker can cause the terminal 200 to obtain the pieces of information stored in the printer 10 by capturing the QR Code displayed on the printer 10 with the terminal 200. The office worker does not have to manually input these pieces of information to the terminal 200. Thus, convenience for the office worker is improved.

When the BS is completed, the terminal 200 executes Authentication (hereinbelow denoted as "Auth") of the DPP scheme with the printer 10 in T130. Specifically, the terminal 200 firstly generates a shared key by using the public key "PPK" and a private key (not shown) of the terminal 200, and then generates encrypted data by using the shared key. Then, the terminal 200 sends an Auth Request including the encrypted data and a public key (not shown) of the terminal 200 to the printer 10. This Request is a signal that requests the printer 10 to execute authentication and further includes information indicating that the terminal 200 is to operate as the Configurator. Hereinbelow, a Request will be denoted as "Req".

When receiving the Auth Req from the terminal 200, the printer 10 executes authentication for the encrypted data included in the Auth Req. When the authentication succeeds, the printer 10 sends an Auth Response indicating that the authentication succeeded to the terminal 200. This Response includes information indicating that the printer 10 is to operate as the Enrollee. Hereinbelow, a Response will be denoted as "Res". As a result of the Auth being executed, it is determined that the terminal 200 operates as the Configurator and the printer 10 operates as the Enrollee.

When sending the Auth Res to the terminal 200 (T130), the printer 10 executes Config of the DPP scheme with the terminal 200 in T132. Specifically, the printer 10, which is the Enrollee, sends a Config Req to the terminal 200 which is the Configurator. This Req is a signal that requests the terminal 200 to send a CO for printer. The CO for printer is information to be used by the printer 10 to establish a Wi-Fi connection between the printer 10 and the AP 8.

When receiving the Config Req from the printer 10, the terminal 200 generates a CO for printer. The CO for printer includes a Signed-Connector (hereinbelow denoted as "SC") for printer. Then, the terminal 200 sends a Config Res including the CO for printer to the printer 10.

When receiving the Config Res from the terminal 200 (T132), the printer 10 stores the CO for printer in the memory 34 in T134. As above, to establish a Wi-Fi connection between the printer 10 and the AP 8, the terminal 200 can send the CO for printer to the printer 10 (T132) by using the public key "PPK" (T130). The office worker does not have to manually input an SSID and a password of the wireless LAN 4 formed by the AP 8 to the printer 10. As such, convenience for the office worker is improved.

Next, in T140, the printer 10 executes Network Access of the DPP scheme with the AP 8. Specifically, the printer 10 firstly obtains the SC for printer included in the CO for printer stored in T134. Then, the printer 10 sends a DPP Peer Discovery Req including the SC to the AP 8. This Req is a signal that requests the AP 8 to execute authentication. Hereinbelow, DPP Peer Discovery will be simply denoted as "Discovery".

When receiving the Discovery Req from the printer 10, the AP 8 executes authentication by using the SC for printer included in the Req. When the authentication succeeds, the AP 8 generates a connection key and sends a Discovery Res including an SC for AP in the CO for AP to the printer 10.

When receiving the Discovery Res from the AP 8, the printer 10 executes authentication by using the SC for AP included in the Res. When the authentication succeeds, the printer 10 generates a connection key. This connection key is identical to the connection key generated by the AP 8. The connection key is shared between the printer 10 and the AP 8 in this way.

The printer 10 executes 4-way handshake communication with the AP 8 by using the connection key. As a result, in T142, a Wi-Fi connection is established between the printer 10 and the AP 8. That is, the printer 10 connects to the wireless LAN 4 formed by the AP 8.

When the Wi-Fi connection with the AP 8 is established in T142, the printer 10 sends a DPP Status Query Result (hereinbelow denoted simply as "Result") to the terminal 200 in T144. This Result includes information indicating that the Wi-Fi connection has been established between the printer 10 and the AP 8, that is, information indicating that the CO for printer has been sent from the terminal 200 to the printer 10.

When receiving the Result from the printer 10 in T144, the terminal 200 generates a notification e-mail EM1. This notification e-mail EM1 includes the administrator MA "MA1" obtained in T124 as its recipient address. The body of the notification e-mail EM1 includes information "successful" indicated by the Result, the serial number "1234" obtained in T124, the MAC address "MACpr" obtained in T124, and the IP address "IPpr" obtained in T124. Further, the terminal 200 generates a URL1 which is used to access the web server of the printer 10 by adding a predetermined character string (such as "https://") to the IP address "IPpr". The body of the notification e-mail EM1 further includes the generated URL1. In T150, the terminal 200 sends the generated notification e-mail EM1 to the PC 100M via the e-mail server 60.

Figure 5:
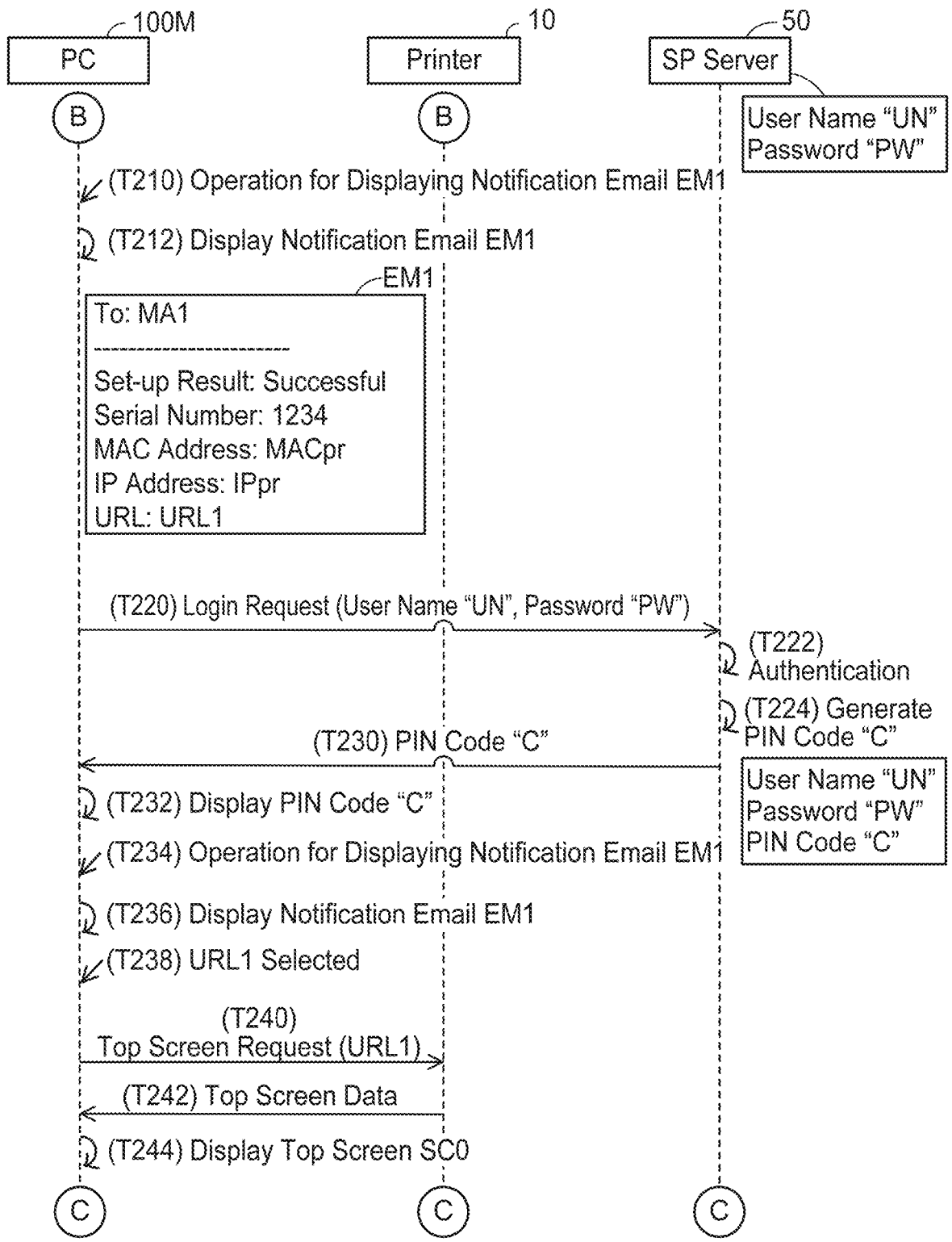
FIG. 5 is a sequence diagram showing a registration process to a service provision server.
Figure 6:
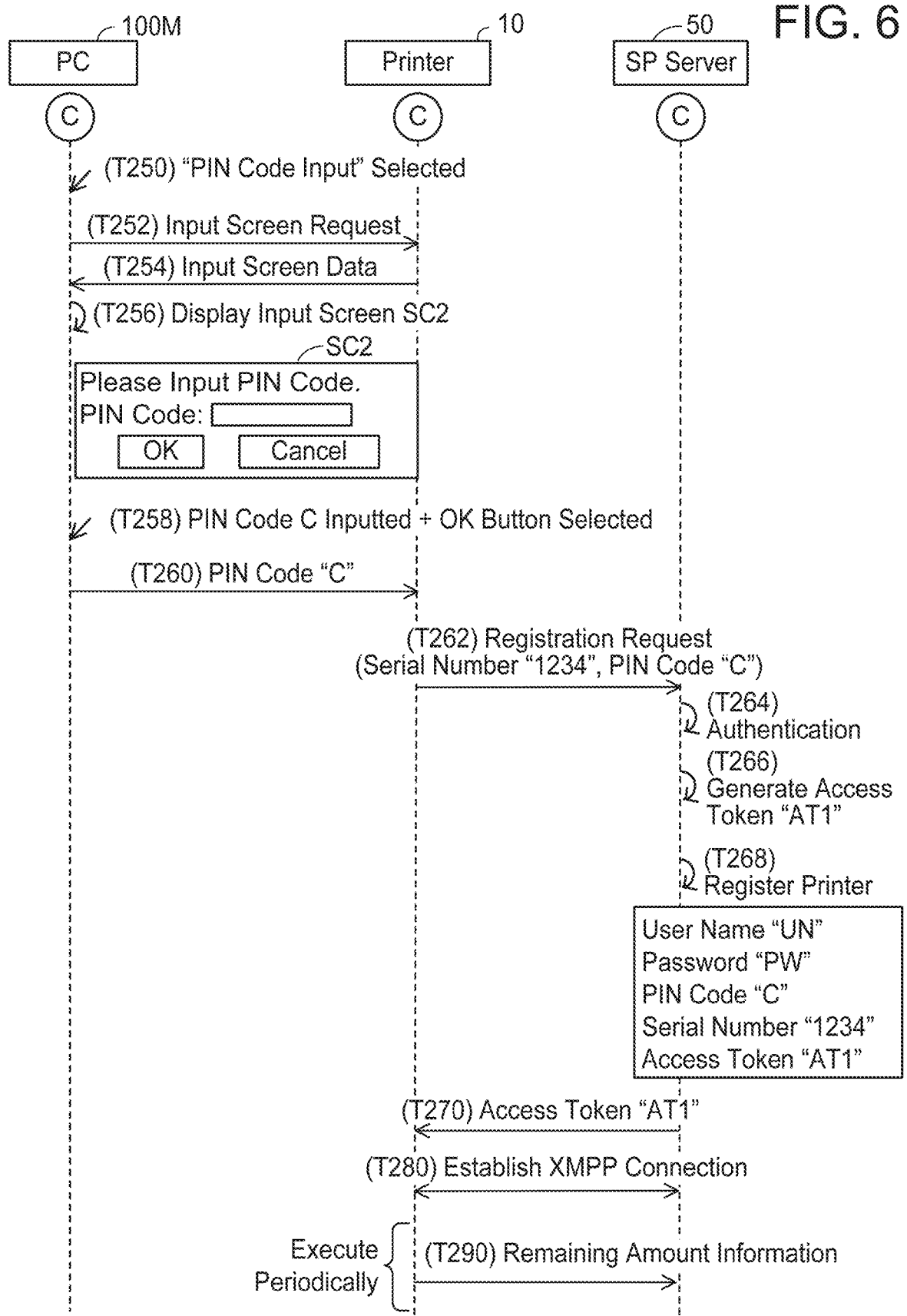
FIG. 6 is a sequence diagram showing a continuation from FIG. 5.

(Registration Process to SP Server 50; FIGS. 5 and 6)

Next, a process for registering information related to the printer 10 to the SP server 50 will be described with reference to FIGS. 5 and 6. In an initial state of FIG. 5, a user name "UN" and a password "PW" of the administrator have been already registered in the SP server 50.

The PC 100M receives the notification e-mail EM1 from the terminal 200 in T150 of FIG. 4, and then accepts an operation for displaying the notification e-mail EM1 from the administrator in T210 of FIG. 5. As a result, the PC 100M displays the notification e-mail EM1 in T212. The administrator can identify the printer 10 based on the serial number "1234", the MAC address "MACpr", and the IP address "IPpr" in the body of the notification e-mail EM1. The administrator can acknowledge that the printer 10 has been connected to the wireless LAN 4 based on the setup result "successful" in the body of the notification e-mail EM1.

After that, the PC 100M accepts an operation of designating a URL of the SP server 50 and an operation of inputting the user name "UN" and the password "PW" from the administrator. In this case, the PC 100M sends a login request including the user name "UN" and the password "PW" to the SP server 50 in T220.

When receiving the login request from the PC 100M in T220, the SP server 50 executes authentication for the user name "UN" and the password "PW" included in the login request. Since the combination of the user name "UN" and the password "PW" has been registered in the SP server 50, the SP server 50 determines that the authentication is successful in T222. In this case, the SP server 50 generates a PIN code "C" in T224 and stores the PIN code "C" in association with the user name "UN" and the password "PW". Then, the SP server 50 sends the PIN code "C" to the PC 100M in T230.

When receiving the PIN code "C" from the SP server 50 in T230, the PC 100M displays the PIN code "C" in T232. As a result, the administrator can acknowledge the PIN code "C".

After that, the operation for displaying the notification e-mail EM1 is performed again by the administrator in T234, and the notification e-mail EM1 is displayed again in T236. In T238, the PC 100M accepts selection of the URL1 included in the body of the notification e-mail EM1 from the administrator. When accepting the selection of the URL1, the PC 100M sends a top screen request including the selected URL1 to the printer 10 in T240. Here, the communication between the PC 100M and the printer 10 is executed via the Internet 6 with use of a Virtual Private Network (VPN), which is a virtual LAN. As such, the printer 10 can receive a trigger signal (i.e., the top screen request) from the PC 100M over a firewall of the LAN 4 via the Internet 6 even though a trigger signal for initiating the communication between the PC 100M and the printer 10 is not sent from the printer 10 to the PC 100M. The VPN is also used in communication to be described hereinbelow (such as T242 and T252 of FIG. 6). Processes of T242 and T244 are similar to the processes to T32 and T34 of FIG. 3.

(Continuation of FIG. 5; FIG. 6)

When accepting selection of the PIN code input button in the top screen SC0 (see the top screen SC0 in T34 of FIG. 3) from the administrator in T250 of FIG. 6, the PC 100M sends an input screen request to the printer 10 in T252.

When receiving the input screen request from the PC 100M in T252, the printer 10 sends input screen data to the PC 100M in T254.

When receiving the input screen data from the printer 10 in T254, the PC 100M displays an input screen SC2 represented by the input screen data in T256. The input screen SC2 includes a message that prompts the user of the PC 100M (i.e., the administrator) to input a PIN code, a PIN code input box, an OK button, and a cancel button.

As described, the administrator has already obtained the PIN code "C" in T232 of FIG. 5. The PC 100M accepts input of the PIN code "C" to the PIN code input box in the input screen SC2 and selection of the OK button from the administrator in T258. In response to this, the PC 100M sends the PIN code "C" inputted in T258 to the printer 10 in T260.

When receiving the PIN code "C" from the PC 100M in T260, the printer 10 sends a registration request to the SP server 50 in T262. This registration request is a signal for registering the printer 10 to the SP server 50 and includes the serial number "1234" of the printer 10 and the PIN code "C".

When receiving the registration request from the printer 10 in T262, the SP server 50 executes authentication for the PIN code "C" included in the registration request. Since the PIN code "C" has been already stored in the SP server 50 (see T224 of FIG. 5), the SP server 50 determines that the authentication is successful in T264. In this case, the SP server 50 identifies the user name "UN" associated with the PIN code "C" (see T224 of FIG. 5). Then, the SP server 50 generates an access token "AT1" in T266. After this, the SP server 50 registers information related to the printer 10 in T268. Specifically, the SP server 50 stores the serial number "1234" included in the registration request and the generated access token "AT1" in association with the pieces of information stored in T224 of FIG. 5. Next, the SP server 50 sends the access token "AT1" to the printer 10 in T270.

As above, the administrator performs the work for registering the information related to the printer 10 to the SP server 50 (see the processes of FIGS. 5 and 6), thus the office worker does not have to perform this work. Thus, the convenience for the office worker is improved.

When receiving the access token "AT1" from the SP server 50 in T270, the printer 10 sends the access token "AT1" to the SP server 50 in T280 to establish an Extensible Messaging and Presence Protocol (XMPP) connection, which is a so-called full-time connection, with the SP server 50. The XMPP connection enables the SP server 50 to send information to the printer 10 over the firewall of the LAN 4 via the Internet 6 even though a signal requesting the information is not sent from the printer 10 to the SP server 50.

After that, the SP server 50 sends a Subscribe request to the printer 10 using the XMPP connection (not shown). The Subscribe request is a signal that requests the printer 10 to periodically (e.g., every day) send remaining amount information indicating a remaining amount of ink in a cartridge attached to the printer 10.

When receiving the Subscribe request from the SP server 50, the printer 10 periodically sends the remaining amount information to the SP server 50 in T290. As a result, the SP server 50 can acknowledge the remaining amount of the ink in the cartridge attached to the printer 10. Due to this, the SP server 50 can execute a process for shipping a new cartridge to the user of the printer 10 (i.e., the office worker) when the remaining amount is less than a threshold, for example.

Effects of Present Embodiment

Figure 7:
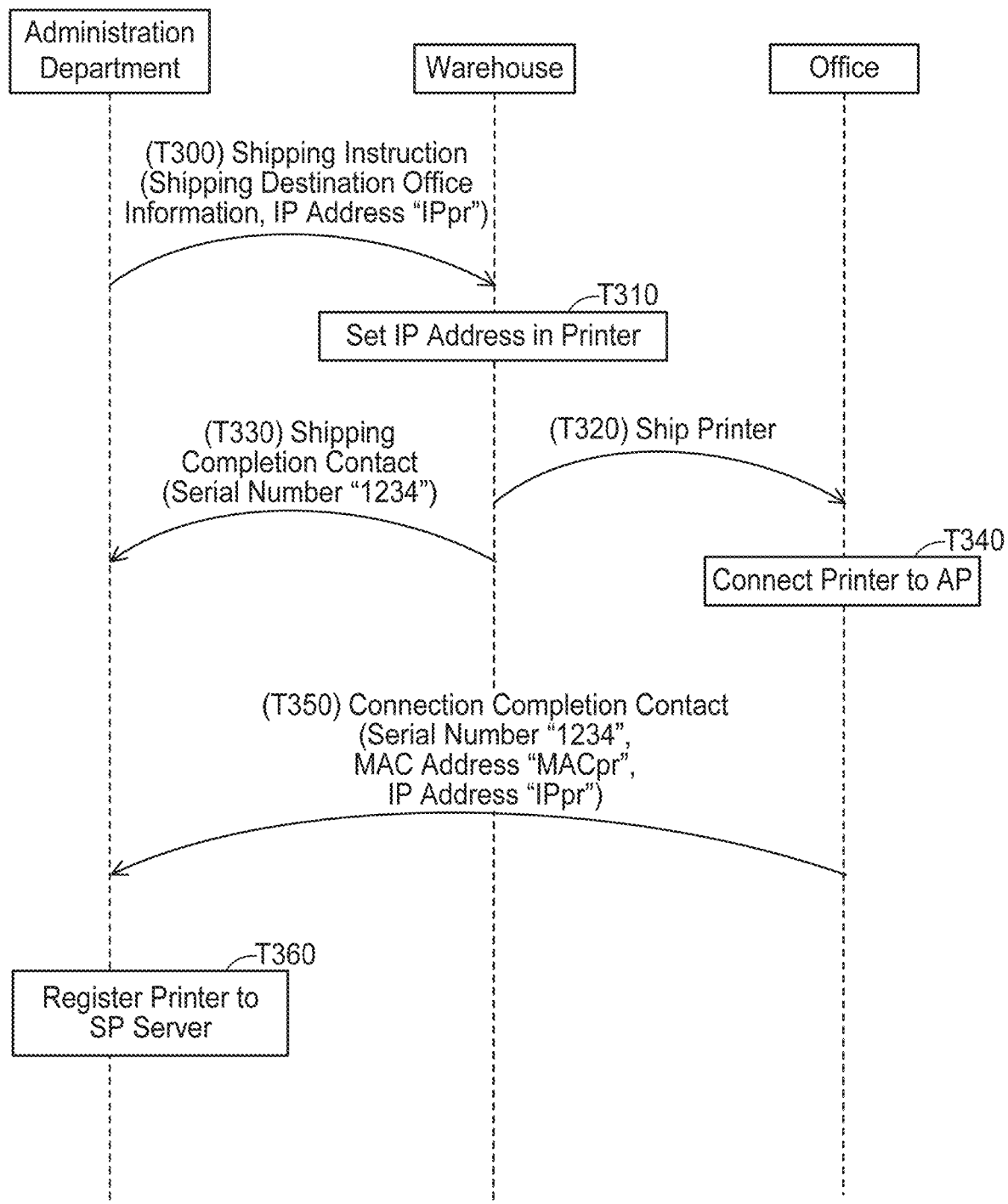
FIG. 7 is a sequence diagram for a comparative example.

Before explanation for effects of the present embodiment, a comparative example will be described with reference to FIG. 7. In the comparative example, the administrator of the administration department firstly gives a shipping instruction to the warehouse worker in T300. This shipping instruction does not include the administrator MA "MA1". In T310, the warehouse worker performs a setting process on the printer 10 according to the shipping instruction from the administrator. In this setting process, the administrator MA "MA1" is not set in the printer 10. Then, the warehouse worker ships the printer 10 to the office in T320. In T330, the warehouse worker informs the administrator of the shipping completion by using a contact measure such as telephone, e-mail, or the like. Specifically, the warehouse worker informs the administrator of the serial number "1234" of the printer 10 shipped to the office. As a result, the administrator can acknowledge that the printer 10 has been shipped to the office and that the printer 10 will be connected to the LAN 4 soon.

When the printer 10 has been delivered to the office, the office worker performs a process for establishing a Wi-Fi connection between the printer 10 and the AP 8 in T340. This process is the same as T110 to T144 of FIG. 4 except that the administrator MA "MA1" is not obtained by the terminal 200. When the printer 10 is connected to the LAN 4, the office worker informs in T350 the administrator of the connection completion by using a contact measure such as telephone, e-mail, or the like. Specifically, the office worker informs the administrator of the serial number "1234", the MAC address "MACpr", and the IP address "IPpr" of the printer 10 connected to the LAN 4. As a result, the administrator can acknowledge that the printer 10 has been connected to the LAN 4, that is, that the administrator can perform the work to register the information related to the printer 10 to the SP server 50.

When informed of the connection completion from the office worker, the administrator performs the process for registering the printer 10 to the SP server 50 in T360. Specifically, the administrator firstly logs into the SP server 50 and obtains a PIN code (see T220 to T232 of FIG. 5). After this, the administrator operates the PC 100M to perform the operation for logging into the web server of the printer 10 by using the IP address "IPpr" set in the printer 10. As a result, the PC 100M sends the top screen request to the printer 10, and when receiving the top screen data from the printer 10, displays the top screen SC0 (see T240 to T244). Processes after this are similar to the processes of FIG. 6.

Contrary to the above, in the present embodiment, the terminal 200 obtains the administrator MA "MA1" by using the printer 10 (T124 of FIG. 4). Then, after the CO for printer has been sent to the printer 10 (T132), the terminal 200 sends the notification e-mail EM1 with the obtained administrator MA "MA1" as the destination (T150). As a result, the administrator can acknowledge, by reading the notification e-mail EM1 using the PC 100M, that the CO for printer has been sent to the printer 10, that is, the printer 10 has been connected to the LAN 4. Therefore, the office worker does not have to inform the administrator of the connection completion as in T350 of FIG. 7. That is, the office worker does not have to contact the administrator by calling the administrator or manually inputting the administrator MA "MA1". As a result, workload on the office worker can be reduced.

Further, when the administrator uses the PC 100M in response to reading the notification e-mail EM1, the printer 10 can suitably execute communication with the PC 100M via the Internet 6 (T240 and T242 of FIGS. 5, T252 and T254 of FIG. 6).

In the above-described comparative example, the administrator has to manually input the IP address "IPpr" of the printer 10 to the PC 100M to access the web server of the printer 10 in T360. To the contrary, in the present embodiment, the administrator can simply select the URL1 in the notification e-mail EM1 in T238 of FIG. 5. Therefore, workload on the administrator can be reduced.

(Corresponding Relationships)

The printer 10, the terminal 200, the PC 100M, and the PC 100A are respectively an example of "communication device", "first terminal device", "second terminal device", and "third terminal device". The application 238 is an example of "computer readable instructions" for the "first terminal device". The administrator MA "MA1", the notification e-mail EM1, the serial number "1234" of the printer 10, and the PIN code "C" are respectively an example of "address information", "notification information", "device information", and "authentication information". The serial number "1234", the MAC address "MACpr", and the IP address "IPpr" of the printer 10 are examples of "identification information". The CO for printer and the public key PPK are respectively an example of "connection information" and "communication information". The Result sent in T144 of FIG. 4 is an example of "result information". The communication in T240 and T242 of FIG. 5 and T252, T254, and T260 of FIG. 6 is an example of "predetermined communication". The top screen request sent from the PC 100M to the printer 10 in T240 of FIG. 5 is an example of "trigger signal".

The process of T124, the process of T132, the process of T144, and the process of T150 of FIG. 4 are respectively an example of "obtain address information", "send connection information", "receive result information", and "send notification information" by the "first terminal device".

The display unit 14 is an example of "output unit" of the "communication device". The process of T52 of FIG. 3 is an example of "store the address information" by the "communication device". The process of T114, the process of T132, and the process of T142 of FIG. 4 are respectively an example of "cause the output unit to output the address information", "receive connection information", and "connect the communication device to the network" by the "communication device". The processes of T240 and T242 of FIG. 5 and T252, T254, and T260 of FIG. 6 are examples of "execute predetermined communication" by the "communication device". The process of T262 is an example of "register the device information to the server" by the "communication device".

(Variant 1) The art described in the above embodiment is effective in situations different from the situation in the embodiment. Specifically, in a case where a client orders the printer 10 to a manufacturing business entity of the printer 10, a worker of the manufacturing business entity may give the shipping instruction to a worker of a logistics business entity that is in charge of logistics for the manufacturing business entity (the logistics business entity may be the same business entity as the manufacturing business entity or a different business entity). The worker of the logistics business entity may perform the setting process on the printer 10 stored in the logistics business entity and then ship the printer 10 to the client. That is, in the present variant, the "administration department", the "warehouse", and the "office" in the above embodiment are respectively replaced with the "manufacturing business entity", the "logistics business entity", and the "client". In another variant, in a case where a client orders the printer 10 to a sales business entity of the printer 10, a worker of the sales business entity may give the shipping instruction to a worker in a warehouse of the sales business entity. The worker in the warehouse may perform the setting process on the printer 10 stored in the warehouse and then ship the printer 10 to the client. That is, in this variant, the "administration department", the "warehouse", and the "office" in the above embodiment are respectively replaced with the "sales business entity", the "warehouse (of the sales business entity)", and the "client".

(Variant 2) The administrator may give the warehouse worker a shipping instruction including an IP address of the PC 100M which the administrator uses instead of the administrator MA "MA1". In this case, the warehouse worker inputs the IP address of the PC 100M in T46 of FIG. 3 instead of the administrator MA "MA1" to set the IP address of the PC 100M in the printer 10. Then, the terminal 200 obtains the IP address of the PC 100M in T124 of FIG. 4, and sends a Hyper Text Transfer Protocol (HTTP) command including the result information "successful" and the like with the IP address as the destination in T150. In the present variant, the IP address of the PC 100M and the aforementioned HTTP command are respectively an example of the "address information" and the "notification information".

(Variant 3) The terminal 200 may send the notification e-mail to the PC 100M after the CO for printer has been sent to the printer 10 (T132 of FIG. 4) and before the Wi-Fi connection is established between the printer 10 and the AP 8. In general terms, "send notification information" may be executed after the connection information has been sent to the communication device. In the present variant, the notification e-mail does not include the setup result. In general terms, the "notification information" may not include the "result information".

(Variant 4) The notification e-mail may not include the serial number "1234", the MAC address "MACpr", nor the IP address "IPpr" of the printer 10. In general terms, the "notification information" may not include the "identification information". In another variant, the notification e-mail may not include the URL "URL1". In general terms, the "notification information may not be used by the second terminal device to execute the predetermined communication.

(Variant 5) The printer 10 may execute any one of processes of the following variants 5-1 to 5-3 instead of displaying the QR Code in T114 of FIG. 4.

(Variant 5-1) The printer 10 may cause the print executing unit 16 to print the QR Code. In this case, the terminal 200 obtains the information such as the administrator MA "MA1" by capturing the printed QR Code. In the present variant, the process in which the terminal 200 obtains the information by capturing the printed QR Code is an example of "obtain address information". Further, the print executing unit 16 of the printer 10 is an example of the "output unit".

(Variant 5-2) The QR Code may be attached to a housing, a user's manual, or a packaging box of the printer 10 in the warehouse. In this case, the terminal 200 obtains the information such as the administrator MA "MA1" by capturing the attached QR Code. In the present variant, the process in which the terminal 200 obtains the information by capturing the attached QR Code is an example of "obtain address information".

(Variant 5-3) The printer 10 may establish a Wi-Fi connection according to Wi-Fi Direct (WFD; registered trademark) scheme with the terminal 200. In this case, the terminal 200 may receive the information such as the administrator MA "MA1" from the printer 10 by using the established Wi-Fi connection. In the present variant, the process in which the terminal 200 receives the information from the printer 10 by using the Wi-Fi connection is an example of "obtain address information". Further, the network I/F 18 of the printer 10 is an example of the "output unit".

(Variant 6) The communication according to the DPP scheme may not be executed between the printer 10 and the terminal 200. In this case, in T114 of FIG. 4, the printer 10 displays a QR code obtained by coding information (e.g., the administrator MA "MA1") that does not include the public key "PPK". The terminal 200 does not obtain the public key "PPK" in T124, and instead obtains the information such as the administrator MA "MA1". T130 to T144 are not executed. Then, any one of the following variants 6-1 to 6-3 may be realized.

(Variant 6-1) The office worker may connect the printer 10 to the terminal 200 via a USB cable, for example. In this case, the terminal 200 may send authentication information used in an authentication server in a wired LAN to the printer 10 through the USB cable. After this, each of the terminal 200 and the printer 10 is connected to the wired LAN. The printer 10 is authenticated by the authentication server using the authentication information, as a result of which the printer 10 can execute communication via the wireless LAN. A process after this is similar to T150. In the present variant, the wired LAN is an example of the "network", and the process in which the terminal 200 sends the authentication information to the printer 10 is an example of "send connection information". Further, in general terms, the "connection information" may not be information for establishing a wireless connection with an access point, and the "code image" may not include the communication information.

(Variant 6-2) The printer 10 may operate as a Group Owner of the WFD scheme, and may display a QR Code obtained by coding an SSID and a password for WFD for establishing a Wi-Fi connection according to the WFD scheme with the printer 10 in T114 of FIG. 4. The terminal 200 uses the SSID and the password for WFD to establish a Wi-Fi connection according to the WFD scheme with the printer 10. Then, the terminal 200 sends an SSID and a password for AP for establishing a Wi-Fi connection with the AP 8 to the printer 10 by using the Wi-Fi connection according to the WFD scheme. The printer 10 establishes a Wi-Fi connection with the AP 8 by using the SSID and the password for AP. A process after this is similar to T150. In the present variant, the process in which the terminal 200 sends the SSID and the password for AP to the printer 10 is an example of "send connection information". Further, the SSID and the password for WFD are examples of the "communication information".

(Variant 6-3) The office worker may connect the printer 10 to the terminal 200 via a USB cable, for example. In this case, the terminal 200 may send an SSID and a password for SoftAP to the printer 10 through the USB cable. The SSID for SoftAP and the password are information for establishing a Wi-Fi connection with the terminal 200 operating as a SoftAP. The printer 10 uses the SSID and the password for SoftAP to establish a Wi-Fi connection with the terminal 200. A process after this is similar to T150. In the present variant, a wireless network in which the terminal 200 operates as the SoftAP is an example of the "network", and the process in which the terminal 200 sends the SSID for SoftAP and the password to the printer 10 is an example of "send connection information".

(Variant 7) The PC 100M may not execute the processes from T220 of FIG. 5. In the present variant, the "predetermined communication" is not executed. Further, in the present variant, "register the device information to the server" may be omitted.

(Variant 8) The PC 100M may send the printer 10 a status request that requests the printer 10 to send status information of the printer 10 and receive the status information from the printer 10, instead of the processes from T220 of FIG. 5. In the present variant, the communication of the status request and the status information is an example of the "predetermined communication". Further, in the present variant, "register the device information to the server" may be omitted.

(Variant 9) The warehouse worker may directly input the administrator MA "MA1" to the printer 10 by operating the operation unit 12 of the printer 10, instead of the processes of T20 to T50 of FIG. 3. In this case, the printer 10 stores the administrator MA "MA1" inputted by the warehouse worker. In the present variant, "store the address information" may be omitted.

(Variant 10) In the above embodiment, the processes of FIGS. 3 to 6 are realized by software (e.g., the program 36, the OS program 236, and the application 238), however, at least one of these processes may be realized by hardware such as a logic circuit.

What is claimed is:

1. A non-transitory computer-readable recording medium storing computer readable instructions for a first terminal device, wherein the computer readable instructions, when executed by a processor of the first terminal device, cause the first terminal device to:

obtain address information by decoding a code image captured by a camera of the first terminal device from a communication device different from the first terminal device or by using a direct wireless connection which has been established between the first terminal device and the communication device, the direct wireless connection being not via an access point, the address information being for sending information to a second terminal device different from both the first terminal device and the communication device;

send connection information to the communication device after obtaining the address information, the connection information being for the communication device to connect to a network; and in a case where the connection information has been sent to the communication device, automatically send notification information to the second terminal device with the obtained address information as a destination, the notification information indicating that the connection information has been sent to the communication device.

2. The non-transitory computer-readable recording medium as in claim 1, wherein the notification information is used by the second terminal device to execute predetermined communication via Internet between the second terminal device which has received the notification information and the communication device.

3. The non-transitory computer-readable recording medium as in claim 1, wherein the address information stored in the communication device is obtained by using the communication device.

4. The non-transitory computer-readable recording medium as in claim 1, wherein the address information is obtained by decoding the code image which is output by the communication device.

5. The non-transitory computer-readable recording medium as in claim 4, wherein the code image is displayed on a display unit of the communication device.

6. The non-transitory computer-readable recording medium as in claim 4, wherein
the code image is obtained by coding both the address information and communication information for sending the connection information to the communication device,
the address information and the communication information are obtained by decoding the code image, and
after the address information and the communication information have been obtained, the connection information is sent to the communication device by using the communication information.

7. The non-transitory computer-readable recording medium as in claim 1, wherein
the address information and identification information for identifying the communication device are obtained, and
the notification information sent to the second terminal device includes the obtained identification information.

8. The non-transitory computer-readable recording medium as in claim 7, wherein
the identification information included in the notification information is used by the second terminal device to execute predetermined communication via Internet between the second terminal device which has received the notification information and the communication device identified by the identification information.

9. The non-transitory computer-readable recording medium as in claim 1, wherein
the computer readable instructions, when executed by the processor, further cause the first terminal device to:
receive result information from the communication device after the connection information has been sent to the communication device, the result information indicating whether the communication device has connected to the network by using the connection information, and
the notification information includes the received result information.

10. The non-transitory computer-readable recording medium as in claim 1, wherein the address information is an e-mail address or an Internet Protocol (IP) address of the second terminal device, and an e-mail including the notification information is sent with the address information as the destination or a Hypertext Transfer Protocol (HTTP) command is sent using the IP address.

11. The non-transitory computer-readable recording medium as in claim 1, wherein
the connection information is information for the communication device to establish a wireless connection with an access point that forms the network.

12. A communication device comprising:
an output unit;
a memory configured to store address information, wherein the address information is obtained by a first terminal device different from the communication device, and the address information is for sending information to a second terminal device different from the communication device and the first terminal device; and
a controller,
wherein the controller is configured to:
cause the output unit to output the address information in the memory to be obtained by the first terminal device;
receive connection information from the first terminal device, the connection information being for the communication device to connect to a network, wherein in a case of sending the connection information to the communication device, notification information is sent to the second terminal device with the obtained address information as a destination from the first terminal device, the notification information indicating that the connection information has been sent to the communication device;
in a case where the connection information is received from the first terminal device, connect the communication device to the network by using the connection information; and
after the communication device has been connected to the network, execute predetermined communication via Internet by using the network with the second terminal device which has received the notification information.

13. The communication device as in claim 12, wherein
the controller is configured to cause the output unit to output a code image obtained by coding the address information, and
in a case where the code image is captured by a camera of the first terminal device and the code image is decoded by the first terminal device, the address information is obtained by the first terminal device.

14. The communication device as in claim 13, wherein
the controller is configured to cause the output unit to output a code image obtained by coding the address information and communication information for sending the connection information to the communication device,
in a case where the code image is captured by the camera of the first terminal device and the code image is decoded by the first terminal device, the address information and the communication information are obtained by the first terminal device, and
in a case where the communication information is used by the first terminal device after the address information and the communication information have been obtained by the first terminal device, the controller is configured to receive the connection information from the first terminal device.

15. The communication device as in claim 12, wherein
the memory further stores identification information for identifying the communication device,
the controller is configured to cause the output unit to output the address information in the memory and the identification information in the memory,
the address information and the identification information are obtained by the first terminal device,
the notification information includes the identification information, and
in a case where the identification information included in the notification information is used by the second terminal device, the controller is configured to execute the predetermined communication with the second terminal device.

16. The communication device as in claim 12, wherein
the connection information is information for the communication device to establish a wireless connection with an access point that forms the network, and
the controller is configured to connect the communication device to the network by establishing a wireless connection with the access point by using the connection information.

17. The communication device as in claim 12, wherein
the predetermined communication includes the communication device receiving a trigger signal for starting the predetermined communication from the second terminal device without the communication device sending the trigger signal to the second terminal device.

18. The communication device as in claim 12, wherein the predetermined communication includes the communication device receiving, from the second terminal device, authentication information for registering device information related to the communication device to a server, and the controller is further configured to register the device information to the server by using the authentication information after the predetermined communication including the communication device receiving the authentication information from the second terminal device has been executed.

19. The communication device as in claim 12, wherein the controller is further configured to store the address information in the memory in a case where the address information is received from a third terminal device different from the communication device, the first terminal device, and the second terminal device.

20. A first terminal device comprising:
a wireless communication interface or both a wireless communication interface and a camera; and a controller configured to obtain address information by decoding a code image captured by a camera of the first terminal device from a communication device different from the first terminal device or by using a direct wireless connection which has been established between the first terminal device and the communication device via the wireless communication interface, the direct wireless connection being not via an access point, the address information being for sending information to a second terminal device different from both the first terminal device and the communication device;

send connection information to the communication device after obtaining the address information, the connection information being for the communication device to connect to a network; and in a case where the connection information has been sent to the communication device, automatically send notification information to the second terminal device with the obtained address information as a destination, the notification information indicating that the connection information has been sent to the communication device.

* * * * *